Jan. 9, 1940.  H. D. PHILIPS  2,186,618
LAMP HOUSE CONSTRUCTION
Filed April 27, 1937   2 Sheets-Sheet 1

Harlow D. Philips,
INVENTOR
BY
ATTORNEYS.

Jan. 9, 1940.  H. D. PHILIPS  2,186,618
LAMP HOUSE CONSTRUCTION
Filed April 27, 1937  2 Sheets-Sheet 2
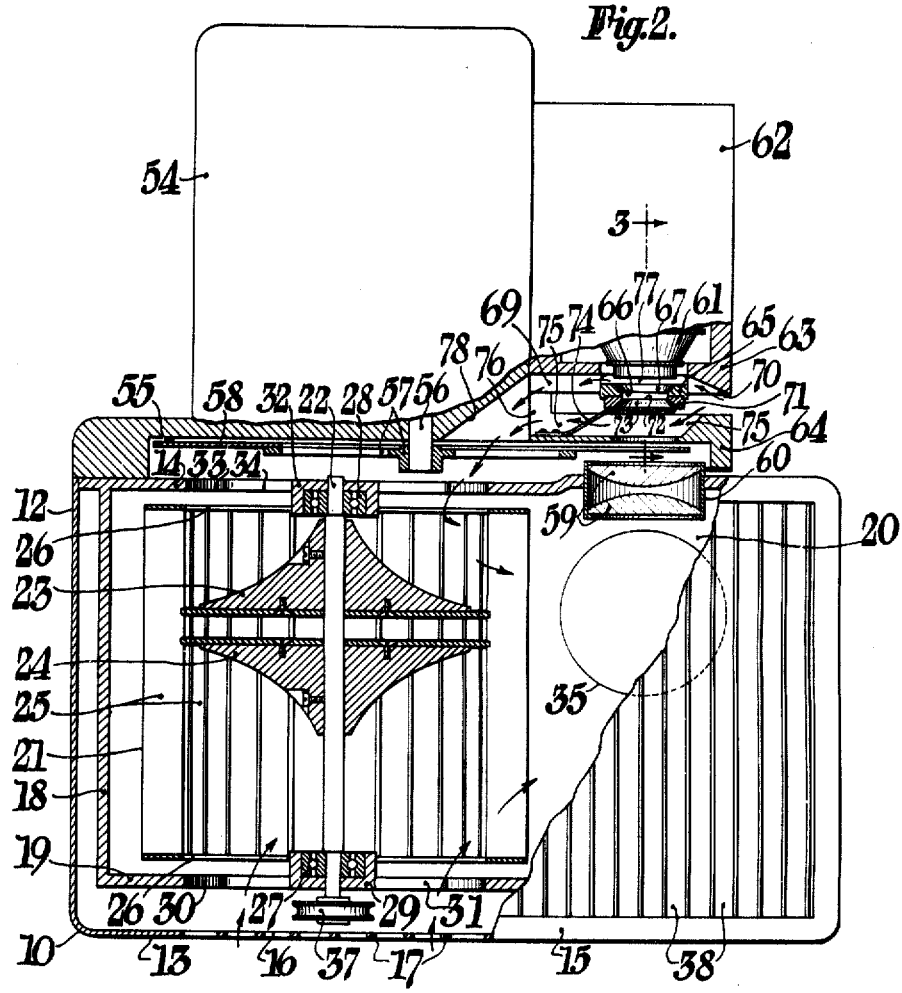
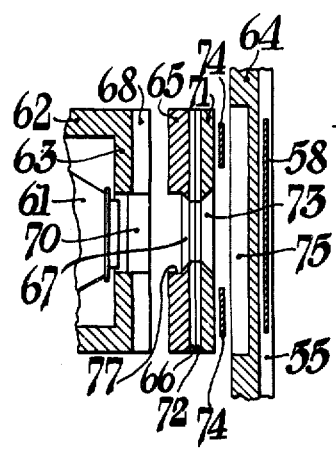
Harlow D. Philips,
INVENTOR.
BY Newton M. Perkins
George A. Gillette Jr.
ATTORNEYS.

Patented Jan. 9, 1940

2,186,618

UNITED STATES PATENT OFFICE 2,186,618

LAMP HOUSE CONSTRUCTION

Harlow D. Philips, Rochester, N. Y., assignor to Eastman Kodak Company, Rochester, N. Y., a corporation of New Jersey Application April 27, 1937, Serial No. 139,240

7 Claims. (Cl. 88—17)

The present invention relates to a ventilating system for a projector and more particularly to the lamp house construction thereof.

The increased illumination made available in projectors by the use of more powerful light sources has at the same time introduced a problem in ventilation. Of course, it is desirable especially for home use to design the projector so that no direct rays from the light source may strike the walls or ceiling of the room. It is well known that the lamp houses of projectors may be provided with light baffles to prevent the emission of direct rays from the lamp house but heretofore such light baffling has been accomplished only at the expense of building up considerable back pressure in the lamp house and decreasing the ventilating or cooling effect of the air blown through the lamp house.

The primary object of the present invention is the provision, in a projector having a fan for circulating an air blast over the light source, of light baffling means which prevents the passage of any direct light rays but which also offers little, if any, additional resistance to the circulation of air through the lamp house.

Another object of the invention is the provision of a baffling means comprising a plurality of formed members which are nested in spaced relation so as to provide low resistance passages for the air blast moving across the light source and still prohibiting the passage of direct light rays between said baffles.

A further object of the invention is the provision in a projector including a fan with an intake opening of a plurality of channels adjacent the film gate of the projector and leading to the intake opening of the fan so that a circulation of air with the accompanying cooling effect is produced around the film gate.

Other and further objects of the invention will be suggested to those skilled in the art by the following disclosure.

The above and other objects of the invention are attained by providing a plurality of arcuate baffles nested in spaced relation in the path of the air blast beyond the light source. Said baffles are arranged so that direct light rays cannot pass therebetween and so that a plurality of low resistance passages are formed for the escape of air from the lamp house. In addition, this reduction of back pressure upon the exhaust side of the fan permits a slight additional load on the intake side of the fan so that according to the invention the frame members of the projector are provided with recesses adjacent the optical system and film gate of the projector and forming intake air passages leading from the film gate to the intake opening of the fan assembly. Thus not only is a freer circulation of air around the lamp obtained but an induced circulation of air is created around the film gate and optical system.

Reference is made to the accompanying drawings wherein similar reference characters designate similar elements and wherein:

Fig. 2 is a plan view of the projector with a section broken away along the axes of the fan and optical system or upon the line 2—2 of Fig. 1.

Fig. 3 is an exploded partial section of the projector film gate taken on line 3—3 of Fig. 2.

Figure 1:
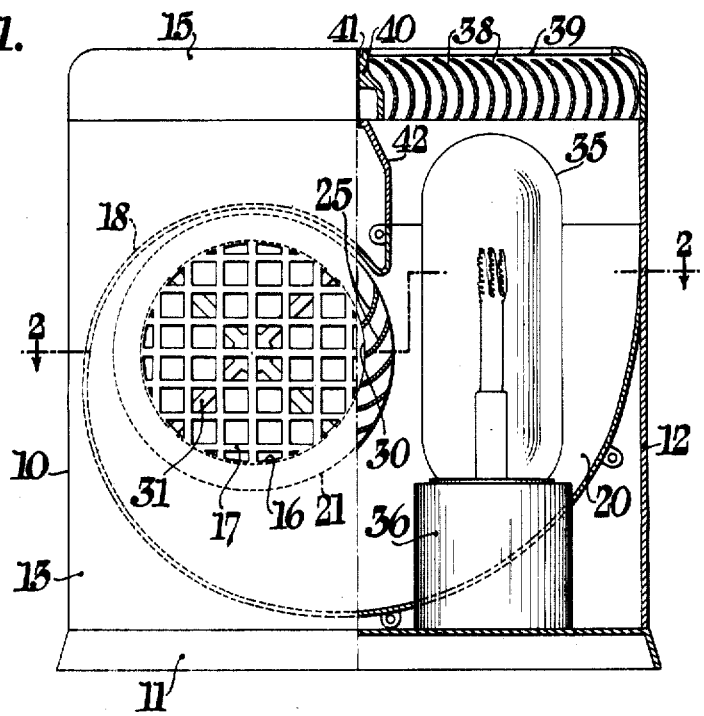
Fig. 1 is a rear view, in partial section, of a projector equipped with a light baffling means according to the invention.

Although the present invention is to be described with respect to a motion picture projector, it is clear that the features of the invention may be employed to equal advantage in any type of projector or in any type of apparatus including a lamp house to be cooled by circulation of an air blast.

The projector may comprise a lamp housing 10 which is mounted upon a base 11. The lamp housing 10 has side walls 12, a rear wall 13, a front wall 14 and a cover 15. The rear wall 13 is provided with an opening 16 across which a grill 17 extends.

A fan assembly is associated with the projector and may be located within lamp housing 10. Such a fan means comprises a fan casing 18 which has a side wall 19 and an exhaust throat 20. The fan rotor 21 includes a shaft 22 carrying spider members 23 and 24 to which a plurality of longitudinally extending fan blades 25 are attached. A pair of cheek rings 26 are fastened to each end of the respective fan blades 25. Anti-friction bearings 27 and 28 support each end of shaft 22, bearing 27 being journaled in a cup 29 which is supported at the center of an intake opening 30 in the side wall 19 of fan casing 18 by a plurality of spokes 31. Similarly bearing 28 is journaled in a cup 32 which is supported at the center of an intake opening 33 in the front wall 14 of lamp housing 10 by a plurality of spokes 34.

The light source is supported within the lamp housing 10 and within the exhaust throat 20 of the fan assembly and may comprise an incandescent lamp 35 which fits into a socket 36, see Fig. 1. The socket 36 extends through the wall of fan casing 18.

The fan rotor 21 is driven by any suitable prime mover, not shown, and connected to a pulley 37 on shaft 22. Such rotation of fan rotor 21 will draw air through the intake openings 30 and 33 at each end of the fan rotor and also through the opening 16 of the rear wall 13 of lamp housing 10. An air blast will be discharged from said rotating fan 21 through the exhaust throat 20 and over the incandescent lamp 35. The free circulation of said air blast would be obtained by leaving the top of the lamp housing entirely open but under such a condition a large area of the room ceiling would be brightly illuminated to detract in a well known manner from the picture projection.

According to the invention a light baffling means is provided in the path of the air blast beyond the light source and may comprise a plurality of curved members 38 which may be supported in the cover 15, said cover 15 being provided with an opening 39 above said members 38. Cover 15 includes a central portion 40 which receives a bolt 41 engaging a central partition 42 within lamp housing 10. The curved members 38 are nested in spaced relation so that a straight line cannot be drawn between any pair of said members 38 without intersecting one of them. Such nested spacing of members 38 insures that a direct light ray cannot pass between said members 38 which are preferably provided with a black matte surface so that any reflections from one member to the other are reduced to a minimum. Such arrangement of said curved members 38 provides a plurality of low resistance air passages therebetween so that the air blast is relatively free to pass from the lamp housing 10 especially in view of the total prohibition from the passage of a direct light beam. Furthermore, the air blast passing between the curved baffle members 38 is subjected only to a gradual and easy change in direction so that only a small back pressure is built up against the fan assembly within the exhaust throat 20.

According to Figs. 1 and 2 the curved baffle members 38 extend longitudinally of the projector for proper but the aforementioned light baffling means is equally effective if the baffle members extend transversely of the projector and of the axis of rotation of the fan. This modification of the invention is illustrated in Fig. 4.

Figure 4:
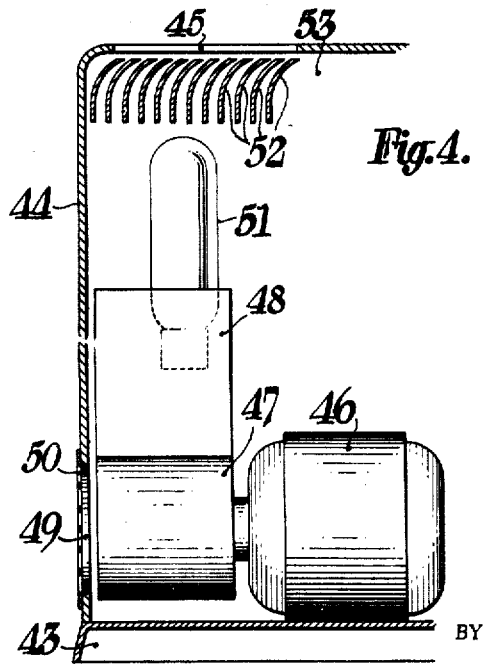
Fig. 4 is a vertical section through a projector including a modified arrangement of the light baffling means according to the invention.

According to Fig. 4 the projector includes a base 43, a lamp housing 44 provided at the top with an opening 45. A motor 46 is mounted within housing 44 to drive a fan, not shown, but mounted in a known manner within a fan casing 47 having an exhaust throat 48. The lamp housing 44 is provided with an opening 49 located opposite the intake for fan casing 47 and covered by a grill 50. As before, the incandescent lamp 51 is mounted within the exhaust throat 48. The plurality of arcuate baffle members 52 are mounted between the side walls 53 of lamp housing 44 or in any other suitable manner but are mounted in nested spaced relation so that low resistance passages for the air blast are provided between said baffle members 52 but still in such relation that a direct light beam cannot be projected from lamp 51 between baffle members 52 and through opening 45.

A further feature of the projector ventilating system, according to the invention, is the circulation of intake air for the fan around the optical system and film gate of the projector. Such feature will now be described.

The projector may also comprise a mechanism housing 54, see Fig. 2, which is provided with a shutter recess 55. A shutter shaft 56 is rotatably mounted in mechanism housing 54 and carries a perforated spider 57 to which the shutter blades 58 are attached.

The optical system for the projector may comprise a pair of condenser lenses 59 which are mounted within a shell 60 in the front wall 14 of lamp housing 10 and also an objective 61 which is mounted within a front frame member 62 having a rear wall 63. A second frame member 64 is mounted between lamp housing 10 and front frame member 62. A film gate is supported by said frame members 62 and 64 in line with the light source 35 and the optical system composed of condenser lenses 59 and objective 61. Said film gate comprises a front gate member 65 which is provided in the usual manner with a film guideway 66 and which is provided with a flared opening 67. Said gate member 65 is attached to the rear wall 63 of front frame member 62, which wall 63 may be provided with a recess 68 for this purpose, see Fig. 3. Said rear wall 63 of frame member 62 is provided with a transverse recess 69 which is adjacent said opening 67 in gate member 65 and also the rear end of objective 61. The outer end of transverse recess 69 has an inclined wall 70. Movable gate member 71 is also provided with a film guideway 72 and a flared opening 73. Gate member 71 may be resiliently held against the fixed gate member 65 by a pair of springs 74 which are fastened to the second frame member 64 and which bear against the rear surface of said movable gate member 71. Said second frame member 64 is provided with a recess 75 which is co-extensive with the movable gate member 71 and which may have sloping side walls. Frame member 64 may also be provided with a recess 76 for freer circulation of air to the intake of the fan assembly. By making recess 75 as large as the movable gate 71 a greater range of movement can be permitted said movable gate member during threading of film into the projector. The front side of the fixed gate member 65 may be provided with a recess 77 which is adjacent the flared opening 67 in gate member 65, see Fig. 3.

The transverse recess 69 in rear wall 63 and the recess 77 in front gate member 65 form an intake air passage leading toward the fan intake, it may be necessary to provide a recess 78 in the mechanism housing for continuation of such intake air passage to the fan. In the same manner recesses 75 and 76 in the second frame member 64 also form an intake air passage behind the film gate and leading to the intake opening of the fan assembly.

In some projector designs it is more advantageous or convenient to place the shutter so that it is interposed between the film gate and lamp housing, consequently, according to the present invention the shutter is mounted upon a perforated spider 57 so that the aforementioned intake air passages from the film gate are not interrupted by the rotating shutter but may pass through the openings in such perforated spider 57 and through the intake opening 33 in wall 14 to the fan rotor 21. The arrows in Fig. 2 illustrate the flow of the intake air through the various recesses, past the film gate, through the mechanism housing 54, through the perforated spider 57 and into the intake opening 33. Other arrows indicate the flow of air through the opening 16 in the rear wall 13 and through intake opening 30 in the side wall 19 of fan casing 18.

Since the present invention is susceptible of various modifications without departing from the spirit of the invention, the scope thereof is to be determined by the appended claims.

Having now particularly described my invention what I desire to secure by Letters Patent of the United States and what I claim is:

1. A projection apparatus comprising a lamp-housing adapted to contain a light source, a fan means associated with said housing for creating an exhaust air blast upon said light source and including two intake openings, an optical system, a film gate, frame members supporting said optical system and said film gate in alignment with said light source, and light baffling means on said housing in the path of said exhaust air blast beyond said light source and including a plurality of smoothly curved members nested in spaced relation to provide low resistance passages for said exhaust air blast and to prevent direct light rays from passing between said formed members, said frame members being provided with open recesses adjacent said optical system to form smooth intake air passages leading from said film gate to one of the intake openings of said fan means.

2. A projection apparatus comprising a lamp-housing adapted to contain a light source, a fan means associated with said housing for creating an exhaust air blast upon said light source and including a pair of intake openings, an optical system, a film gate including a pair of gate members which are each provided with an opening, frame members supporting said optical system in alignment with said light source and supporting said gate members with the openings therein in alignment with said light source, and light baffling means on said housing in the path of said exhaust air blast beyond said light source and including a plurality of arcuate members so curved and so nested in spaced relation as to provide low resistance passages for said exhaust air blast and to prohibit passage of direct light rays between said arcuate members, said frame members being provided with open recesses adjacent said optical system and one of said gate members being recessed adjacent the opening therein to form an air passage leading from said film gate to one of the intake openings of said fan means.

3. A photographic projection apparatus comprising a lamp housing adapted to contain a light source, a optical system, a film gate, frame members supporting said optical system and said film gate in alignment with said light source, and a fan assembly including a fan casing having an exhaust throat connected to said lamp housing and provided with a pair of intake openings and including a fan rotor for drawing through each intake opening an equal proportion of the air for the exhaust air blast upon said light source, said intake opening for the smaller portion of the air drawing from the vicinity of the film gate.

4. A photographic projection apparatus comprising a lamp housing adapted to contain a light source, an optical system, a film gate, frame members supporting said optical system and said film gate in alignment with said light source, and a fan assembly including a fan casing having an exhaust throat connected to said lamp housing and provided with a pair of intake openings and including a fan rotor for drawing through each intake opening a predetermined proportion of the air which is moved through said lamp housing, said frame members being provided with open recesses without abrupt surfaces and which extend from said film gate to one of said intake openings.

5. A projection apparatus comprising a lamp housing adapted to contain a light source, a fan means associated with said housing for creating an exhaust air blast upon said light source and including an intake opening, an optical system, a film gate including a pair of gate members which are each provided with an opening, and a frame member supporting said optical system in alignment with said light source and fixedly supporting one gate member with its opening in alignment with said optical system, said frame member and the fixed gate member each being recessed adjacent the optical system and opening in said fixed gate member to form an air passage leading from said gate opening to the intake opening of said fan means.

6. A projection apparatus comprising a lamp housing adapted to contain a light source, a fan means associated with said housing for creating an exhaust air blast upon said light source and including an intake opening, an optical system, a film gate including a pair of gate members which are each provided with an opening, a frame member supporting said optical system in alignment with said light source and fixedly supporting one gate member with its opening in alignment with said optical system, and a second frame member movably supporting the other gate member, said first frame member and the fixed gate member each being recessed adjacent the optical system and opening in said fixed gate member and said second frame member being recessed co-extensively with said movable gate member to form air passages leading past said film gate to the intake opening of said fan means.

7. A projection apparatus comprising a lamp housing adapted to contain a light source, a fan means associated with said housing for creating an exhaust air blast upon said light source and including an intake opening, an optical system, a film gate including a pair of gate members which are each provided with an opening, frame members supporting said optical system in alignment with said light source and supporting said gate members with the openings therein in alignment with said light source, and a rotatable shutter having a perforated spider between said frame member and the intake opening of said fan means, said frame member being provided with recesses adjacent said optical system and the openings in said gate members to form intake air passages leading from said film gate, through said perforated spider of the shutter and to the intake opening of said fan means.

HARLOW D. PHILIPS.

CERTIFICATE OF CORRECTION.

Patent No. 2,186,618. January 9, 1940.

HARLOW D. PHILIPS.

It is hereby certified that error appears in the printed specification of the above numbered patent requiring correction as follows: Page 3, first column, line 55, claim 3, for "a optical" read an optical; line 62, same claim, for "equal" read unequal; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.